United States Patent

Balestra et al.

[11] Patent Number: 5,427,165
[45] Date of Patent: * Jun. 27, 1995

[54] REINFORCEMENT ASSEMBLAGES WITH MONOFILAMENTS OF LIQUID CRYSTAL ORGANIC POLYMERS

[75] Inventors: Claudio Balestra, Marly; Joel Ribiere, Wallisellen, both of Switzerland

[73] Assignee: Michelin Recherche et Technique S.A., Fribourg, Switzerland

[*] Notice: The portion of the term of this patent subsequent to Sep. 21, 2010 has been disclaimed.

[21] Appl. No.: 927,637
[22] PCT Filed: Dec. 20, 1991
[86] PCT No.: PCT/CH91/00277
    § 371 Date: Aug. 24, 1992
    § 102(e) Date: Aug. 24, 1992
[87] PCT Pub. No.: WO92/12018
    PCT Pub. Date: Jul. 23, 1992

[30] Foreign Application Priority Data

Dec. 27, 1990 [FR] France ............... 90 16596

[51] Int. Cl.⁶ .................. B60C 5/00; C09K 19/00
[52] U.S. Cl. .................. 152/450; 57/200; 57/243; 57/250; 57/257; 57/902; 152/451; 152/527; 264/178 R; 264/183; 264/108; 428/1; 428/474.4; 428/475.8; 428/476.3; 428/494; 428/495; 428/517; 428/519
[58] Field of Search .............. 428/1, 474.4, 475.8, 428/476.3, 484, 485, 517, 518; 152/450, 451, 527; 264/178 R, 183, 108; 57/200, 243, 250, 257, 907

[56] References Cited

U.S. PATENT DOCUMENTS

| | | | |
|---|---|---|---|
| 2,947,342 | 9/1957 | Holloway | 428/494 |
| 3,778,329 | 11/1973 | Alderfer . | |
| 4,083,829 | 11/1978 | Calundann et al. . | |
| 4,389,839 | 6/1983 | Werff | 57/238 |
| 4,715,418 | 12/1987 | Miyoshi | 152/451 |
| 5,033,523 | 7/1991 | Buyalos | 152/451 |
| 5,092,381 | 3/1992 | Feijen | 152/451 |
| 5,246,776 | 9/1993 | Meraldi | 428/364 |

FOREIGN PATENT DOCUMENTS

0373094 6/1990 European Pat. Off. .
2721787 11/1977 Germany .

OTHER PUBLICATIONS

World Patents Index Latest, Derwent Publications Ltd., JP-A-5843802 (Sumitomo (Sumitomo Rubber Ind KK) 14-03-83.
WO,A,9 100 381 (Michelin Recherche et Technique) 10 Jan. 1991.
Kautschuk und Gummi—Kunststoffe, vol. 36, No. 10, Oct. 1983, Heidelberg DE, pp. 870–874.
Patent Abstracts of Japan, vol. 14, No. 17 (C-675) 16 Jan. 1990 & JP,01 259 062 (Toray Ind. Inc.) 16 Jan. 1989.

Primary Examiner—Paul J. Thibodeau
Assistant Examiner—Leszek Kiliman
Attorney, Agent, or Firm—Brumbaugh, Graves, Donohue & Raymond

[57] ABSTRACT

A reinforcement assemblage formed at least in part of continuous monofilaments of liquid crystal organic polymer or polymers, characterized by the following features:

(a) the diameter $D_m$ of the monofilaments is at least equal to 40 μm and less than 400 μm;

(b) the tenacity $T_a$ of the assemblage is greater than 80 cN/tex;

(c) the secant tensile modulus $M_a$ of the assemblage is greater than 2000 cN/tex;

(d) at least one of the monofilaments is practically wound helically around an axis, the acute angle γ which each monofilament makes with this axis, which is assumed rectilinear, being less than 30°;

(e) the twist of each monofilament on itself is less than 10 turns per meter of assemblage.

Articles reinforced by these assemblages, in particular automobile tires.

15 Claims, 1 Drawing Sheet

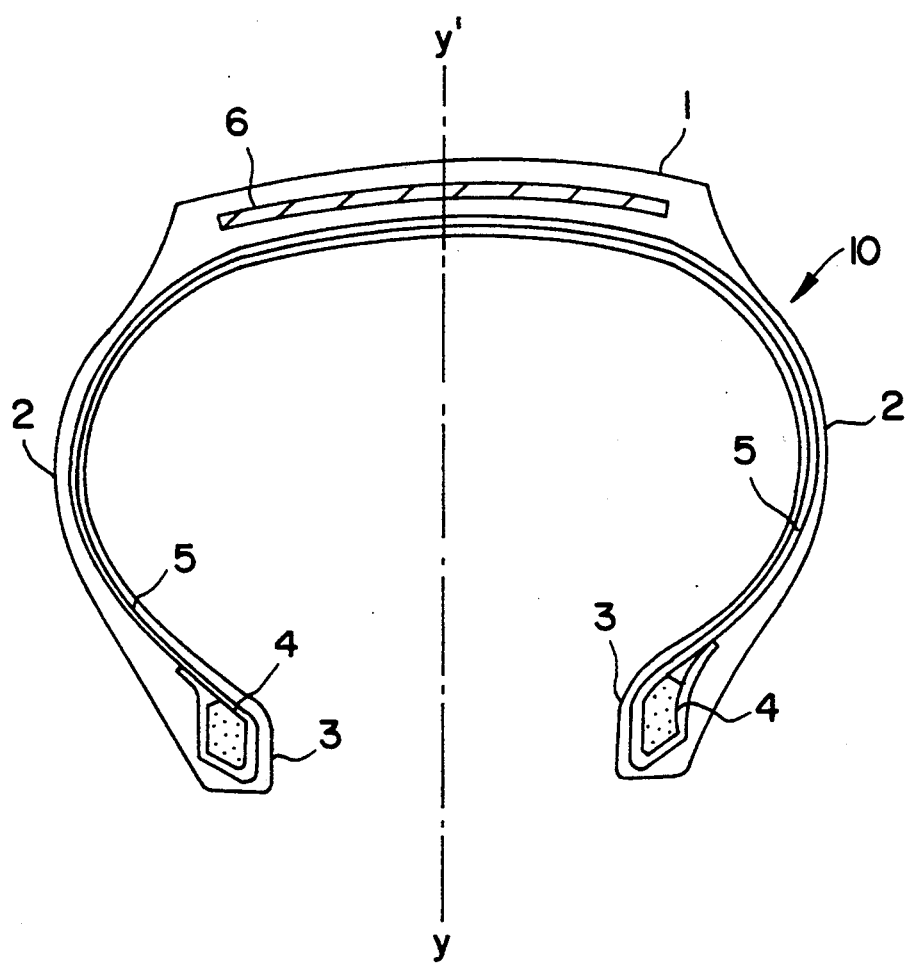

REINFORCEMENT ASSEMBLAGES WITH MONOFILAMENTS OF LIQUID CRYSTAL ORGANIC POLYMERS

BACKGROUND OF THE INVENTION

The present invention relates to reinforcement assemblages formed at least in part of monofilaments of organic material, these assemblages being used to reinforce articles of plastic and/or rubber, particularly automobile tires.

French Patent 1,495,730 and U.S. Pat. No. 3,638,706 describe reinforcement assemblages made with conventional monofilaments of flexible polymers, the diameters of these monofilaments being greater than 100 μm. These assemblages have low tenacities and tensile moduli.

It is known to use reinforcement assemblages formed of plied yarns of multi-filaments of liquid crystal organic polymers, for instance aramid multi-filaments, the diameter of each elementary filament being small, on the order of 13 μm. These assemblages have high tenacities, but their tensile modulus is definitely less than that of the initial multi-filaments.

Japanese Patent Application JP-A-58-43802 describes the use, in the crown of an automobile tire, of monofilaments, possibly twisted together, which monofilaments may be made of aromatic polyamides. Said application does not give any information with regard to the mechanical properties of these monofilaments or of the assemblages which they form.

International Application PCT/CH90/00155, corresponding to U.S. Pat. No. 5,246,776, incorporated herein by reference describes aramid monofilaments having very high moduli and tenacities. Said application briefly mentions the possibility of using these monofilaments in reinforcement assemblages, but without giving any information as to the structure or properties of these assemblages.

SUMMARY OF THE INVENTION

The object of the present invention is therefore to propose a reinforcement assemblage with monofilaments of liquid crystal organic polymer or polymers, said assemblage having very high tenacities and tensile moduli.

Therefore, the reinforcement assemblage in accordance with the invention, formed at least in part of continuous monofilaments of liquid crystal organic polymer or polymers, is characterized by the following features:

(a) the diameter $D_m$ of the monofilaments is at least equal to 40 μm and less than 400 μm;

(b) the tenacity $T_a$ of the assemblage is greater than 80 cN/tex;

(c) the secant tensile modulus $M_a$ of the assemblage is greater than 2000 cN/tex;

(d) at least one of the monofilaments is practically wound in a helix around an axis, the acute angle γ which each monofilament makes with said axis, which is assumed rectilinear, being less than 30°;

(e) the twist of each monofilament on itself is less than 10 turns per meter of assemblage.

The invention also concerns articles reinforced by these assemblages, in particular automobile tires.

DESCRIPTION OF THE DRAWING

The invention will be readily understood on basis of the non-limitative examples which follow and the diagrammatic figure relating to these examples, said figure being a section through a tire.

DESCRIPTION OF PREFERRED EMBODIMENTS

For simplicity in description, in the following text the term "monofilament" designates only monofilaments of a diameter at least equal to 40 μm, and the term "filament" designates only monofilaments the diameter of which is less than 40 μm. The term "yarn" is used for an assembly of several continuous filaments, said assemblages being practically without twist. The term "product" designates a monofilament, a yarn or a textile assemblage.

By "liquid crystal polymer", there is understood herein, in known manner, a polymer capable of giving an optically anisotropic spinning composition in the molten state and at rest, that is to say in the absence of dynamic stress, whether the polymer itself is in the molten state (in which case it is called "thermotropic") or in solution (in which case it is called "lyotropic"). Such a composition depolarizes light when observed through a microscope between crossed linear polarizers.

The invention will be illustrated by the following examples, these examples being produced, unless otherwise indicated, with aramid filaments or monofilaments.

I. Determination of the Properties

1. Conditioning

By conditioning, there is understood in the present specification the treatment of the products in accordance with German Federal Standard DIN 53 802-20/65 of July 1979.

2. Titer

The titer of the products is determined in accordance with Federal German Standard DIN 53 830 of June 1965, these products having been previously subjected to conditioning.

The measurement is effected by weighing at least three samples, each corresponding to a length of 50 m in the case of a monofilament or a yarn, or to a length of 5 m in the case of an assemblage. The titer is expressed in tex. It is indicated as $(Ti)_m$ in the case of monofilaments and $(Ti)_a$ in the case of assemblages.

3. Diameter

The diameter of the monofilaments is determined by calculation from the titer of the monofilaments and their density, in accordance with the formula:

$$D_m = 2 \times 10^{1.5} [(Ti)_m/\pi\rho]^{\frac{1}{2}}$$

$D_m$ representing the diameter of the monofilaments in μm, $(Ti)_m$ representing the titer in tex, and ρ representing the density in g/cm³.

The diameter $D_a$ of the textile assemblages is measured in accordance with the following method. The assemblage is under tension; this tension is between 0.9 and 1.1 times the standard pretension, which is 0.5 cN/tex. The assemblage intersects a parallel beam of light. The shadow cast on a bar of photo-receiving diodes is measured instantaneously. The result of a measurement is the average width of the shadow, determined at 900 points on 50 cm of assemblage. The diameter $D_a$ of the assemblage is calculated by taking the average of four measurements, and it is expressed in μm.

4. Dynamometric Properties

The dynamometric properties of the products are measured by means of a traction machine of Zwick GmbH & Co (Federal Republic of Germany) of type 1435 or 1445, corresponding to Federal German Standards DIN 51 220 of October 1976, DIN 51 221 of August 1976, and DIN 51 223 of December 1977, in accordance with the manner of procedure described in Federal German Standard DIN 53 834 of February 1976. The products are subjected to traction over an initial length of 400 mm. In the case of the yarns, the measurements are carried out after they have been imparted a preliminary protective twist of 100 turns per meter.

In this way, the following properties are determined: tenacity, initial modulus $M_i$, secant modulus $M_a$, elongation upon rupture. The tenacity and the tensile moduli $M_i$, $M_a$ are expressed in cN/tex (centinewton per tex). The elongation upon rupture is expressed in %.

The tenacity is measured for all the products; it is indicated as $T_m$ for the monofilaments and $T_a$ for the textile assemblages.

The initial modulus $M_i$ is defined as the slope of the linear part of the stress-strain curve which is present just after the standard pretension of 0.5 cN/tex. This modulus $M_i$ is measured for the monofilaments and the yarns.

The secant modulus $M_a$ is calculated for the assemblages in accordance with the relationship:

$$M_a = 400 \times \frac{F_1 - F_2}{(Ti)_a}$$

in which $F_i$ is the force to which the assemblage is subjected for an elongation of 0.35%; $F_2$ is the force to which the assemblage is subjected for an elongation of 0.10%.

The elongation upon rupture is determined for all the products. It is designated $(Ar)_m$ for the monofilaments and $(Ar)_a$ for the assemblages.

All the dynamometric properties are determined by taking the average of ten measurements.

5. Density

The densities $\rho$ of the monofilaments are measured using the density gradient tube technique for plastics which is specified in ASTM Standard D1505-68 (reapproved in 1975), Method C, using a mixture of 1,1,2-trichlorotrifluoroethane and 1,1,1-trichloroethane as liquid system for the density gradient tube.

The samples used are short lengths of about 2 cm of monofilaments, knotted but not closely. Before measurement, they are immersed for two hours in the component of the liquid system which has the lowest density. They then remain in said tube for 12 hours before being evaluated. It is particularly seen to it that no air bubbles are retained on the surface of the monofilaments.

The density is determined in g/cm$^3$ for 2 samples per monofilament, and the average value is reported to 4 significant places.

6. Inherent Viscosity

The inherent viscosity (I.V.) of the polymer is expressed in deciliter per gram and defined by the equation:

$$I.V. = (1/C) \, Ln \, (t1/to)$$

in which

C is the concentration of the polymer solution (0.5 g of polymer in 100 cc of solvent, The solvent is 96% concentrated sulfuric acid.

Ln is the natural logarithm.

t1 and to represent the flow time of the polymer solution and of the pure solvent, respectively at 30±0.1° C. in an Ubbelohde type capillary viscosimeter.

7. Optical Properties

The optical anisotropy of the spinning compositions, in the molten state at rest, is observed by means of a polarization microscope of Olympus BH2 type, equipped with a heating stage.

II. Production of the Monofilaments

The aramid monofilaments are prepared by the method claimed in Application PCT/CH90/00155 mentioned above. The essential points of this preparation are as follows:

(a) a solution is used of at least one aromatic polyamide such that at least 85% of the amide linkages (—CO—NH—) are joined attached directly to two aromatic rings, the inherent viscosity of this polyamide or these polyamides being at least equal to 4.5 dl/g, the concentration of the polyamide or polyamides in the solution being at least 20% by weight, this spinning composition being optically anisotropic in the molten state and at rest;

(b) this solution is extruded in a spinneret through a capillary the diameter of which is greater than 80 μm, the spinning temperature, that is to say the temperature of the solution upon its passage through the capillary being at most equal to 105° C.;

(c) the liquid jet emerging from the capillary is drawn in a layer of noncoagulating fluid;

(d) the drawn liquid vein thus obtained is introduced into a coagulating medium, the monofilament which is thus undergoing formation remaining in dynamic contact with the coagulating medium for the time "t", the temperature of the coagulating medium being at most equal to 16° C;

(e) the monofilament is washed and dried; the diameter $D_m$ of the dry monofilament which has thus been completed and the time t are related by the following relationships:

$t = KD^{m2}$; $K > 30$ t being expressed in seconds and $D_m$ being expressed in millimeters.

The monofilaments prepared by this method satisfy each of the following relationships:

$1.7 \leq (Ti)_m < 180$;
$40 \leq D_m < 400$;
$T_m \geq 170 - D_m/3$;
$Mi > 2000$;

$(Ti)_m$ being the titer in tex, $D_m$ being the diameter in μm (micrometers), $T_m$ being the tenacity in cN/tex, Mi being the initial modulus in cN/tex for this monofilament.

Various additives or substances such as, for instance, plasticizers, lubricants, and products for improving the adhesiveness of the product to a rubber matrix can possibly be incorporated in the polymer or the spinning solution or applied to the surface of the monofilament during the different steps of the method previously described.

III. Examples of Production and/or Use of Assemblages

Three automobile tires are used of size 135/70-13. One of these tires is in accordance with the invention while the other two are control tires. The figure diagrammatically shows the tire in accordance with the invention. This tire 10 has a crown 1, two sidewalls 2 and two beads 3 each reinforced by a bead ring 4. A radial carcass ply 5 is arranged from one bead 3 to the other, being turned up around the bead rings 4. The crown 1 is reinforced by a reinforcement 6. These three tires are identical except with respect to the crown reinforcement 6, which is made in the following manner:

Tire in accordance with the invention

It is reinforced by assemblages in accordance with the invention which have the formula $(1+6)18$, that is to say a formula of the layer cable type with one monofilament serving as core and six monofilaments wound in a helix around this core so as to form a layer, the diameter of the monofilaments being about 0.18 mm (180 $\mu$m). The monofilaments are of poly(p-phenylene terephthalamide), and they are prepared in accordance with Chapter II.

The average properties of the monofilaments are as follows:

$(Ti)_m$: 36.4 tex
$D_m$: 180 $\mu$m
$T_m$: 149 cN/tex
Mi: 5300 cN/tex
$(Ar)_m$: 3.7%
$\rho$: 1.43 g/cm$^3$ The properties of the assemblage are as follows:
$\gamma$: 6 degrees
$(Ti)_a$: 258 tex
$D_a$: 540 $\mu$m
$T_a$: 140 cN/tex
$M_a$: 4600 cN/tex
$(Ar)_a$: 3.9%

The angle $\gamma$ of 6° corresponds to the acute angle which the six monofilaments of the layer make with the axis of the assemblage, the monofilament forming the core being oriented along said axis and therefore with an angle $\gamma$ of zero or practically zero, its twist on itself being practically zero.

The twist of each monofilament on itself in the layer of the assemblage is less than 10 turns per meter of assemblage. Two superposed plies are used. Each ply comprises assemblages arranged parallel to each other with a distance of 0.8 mm between two adjacent assemblages, measured from axis-to-axis.

In each ply the assemblages form an angle of 22 degrees with the equatorial plane of the tire 10, represented by the line yy' in the figure, these plies being crossed with respect to this equatorial plane.

Tire not in accord with the inventions, with steel wires

The crown reinforcement 6 comprises two plies, each reinforced with metal cables of formula 6/23. Each of these cables is formed of three strands wound together, each of these strands being formed of two wires which are wound together. The assemblage pitch is 12.5 mm, as is the pitch of each strand. The helical winding of the wires of a strand is effected in a direction opposite that of the winding of the wires of the other two strands. Each wire is of brass-coated steel and has a diameter of 0.23 mm, a resistance to rupture of 2886 MPa, and an elongation upon rupture of 2.4%. Each cable has a diameter of 0.77 mm, a resistance to rupture of 2760 MPa, a tensile modulus of elasticity of 195 GPa and an elongation upon rupture of 2.1%. These mechanical properties are defined in accordance with ASTM Standard D-2969.

In each ply the steel cables form an angle of 22 degrees with the equatorial plane yy' of the tire 10, these plies being crossed with respect to said equatorial plane, the cables of any one ply being parallel to each other, that is to say the general arrangement of the plies is the same for the tire of the invention and for this control tire. The axis-to-axis distance between two adjacent steel cables is 1.7 mm.

Tire not in accord with the invention, with plied yarns of aramids

The crown reinforcement 6 comprises two plies, each reinforced with plied yarns of KEVLAR ® 29 type 950 of du Pont de Nemours, of formula 167x2. Each of these plied yarns is formed of two yarns of 167 tex each, twisted individually to 315 turns per meter and twisted together in opposite direction to 315 turns per meter. The characteristics of this type of yarn are a tenacity of 185 cN/tex, an elongation upon rupture of 3.6%, and an initial modulus of 4900 cN/tex. The properties of the plied yarn produced are a tenacity of 150 cN/tex, an elongation upon rupture of 5.1%, and a secant modulus of 1950 cN/tex.

The general arrangement of the plies is the same as for the tires previously described. The axis-to-axis distance between two plied yarns in this case is 1.25 mm.

Each of the plies, whether or not in accord with the invention, has a resistance to rupture in traction of about 4000 N per cm of width, this resistance being measured parallel to the axes of the assemblages of the ply, the center-to-center distance previously mentioned, as well as the width being measured perpendicular to these axes.

The assemblages of the invention, before incorporation in the rubber, have undergone the following treatment.

These assemblages are placed in contact with a plasma for about 30 minutes, the conditions of this treatment being:

plasma gas: oxygen,
pressure of the gas: 20 Pa (150 millitorrs),
power of the apparatus: 2.5 kW.

The assemblages, after the plasma treatment, pass into a first epoxy resin bath; they experience a heat treatment between 210° and 260° C. for a period of time of between 20 and 120 seconds, for instance 250° C. for 30 seconds. They are then passed into a second bath having a base of butadiene/styrene/vinylpyridine terpolymer latex, resorcinol and formaldehyde, and they undergo a heat treatment between 210° and 260° C. for a period of time of between 20 and 120 seconds, for instance 250° C. for 30 seconds.

In the control tire with aramid plied yarns, the plied yarns, before incorporation in the rubber, are subjected to the same double-bath treatment as the assemblages in accordance with the invention, but without prior plasma treatment.

The rubber of the reinforcements 6 is the same for all three tires, this rubber being of known type.

The weights of the tires are as follows: control tire with steel wires (A): 4.36 kg; tire according to the invention (B): 4.06 kg; control tire with plied yarns (C): 3.94 kg.

The three said tires are subjected to the following tests:

(1) Drift thrust

Each tire is mounted on a 4.00 J 13 wheel and subjected to a load of 315 daN and inflated to 2.2 bars. It is rotated at a speed of 40 km/h on a rotor wheel of a circumference of 8.5 m. The angle of drift is varied and the drift thrust is measured in known manner by measuring the transverse force on the wheel for each of these angles.

The results are set forth in table 1.

TABLE 1

| Tire | Drift thrust (daN) Thrust Angles (degrees) | | | | | |
|---|---|---|---|---|---|---|
| | 1 | 2 | 3 | 4 | 5 | 6 |
| A | 66.7 | 125.8 | 174.3 | 212.9 | 237.5 | 251.2 |
| B | 64.2 | 122.6 | 171.9 | 210.4 | 233.8 | 247.8 |
| C | 62.9 | 118.2 | 158.5 | 188.0 | 210.0 | 226.3 |

A: control tire with steel wires
B: tire in accordance with the invention
C: control tire with plied yarns It is therefore seen that the tire of the invention has a behavior very similar to that of the control tire with steel wires which is not in accord with the invention, but very different from the tire having a textile belt of aramid plied yarns, also not in accord with the invention, the drift thrust of which is much less.

(2) Resistance to rolling

Each tire is mounted on a 4.00 J 13 wheel, inflated to 2.2 bars, and subjected to a load of 315 daN. The resistance to rolling is measured as a function of the speed of rolling of the tire on a rotor wheel the circumference of which is 8.5 m. The resistance to rolling is defined as being the ratio between the force opposing the rolling, expressed in daN, and the load applied on the tire, expressed in tons.

The results are given in table 2.

TABLE 2

| Tire | Resistance to rolling (daN/t) Speeds (km/hr) | | | | | |
|---|---|---|---|---|---|---|
| | 60 | 80 | 100 | 120 | 140 | 160 |
| A | 11.19 | 11.50 | 12.11 | 13.17 | 15.60 | 19.26 |
| B | 11.08 | 11.48 | 12.06 | 13.18 | 15.57 | 19.35 |
| C | 11.28 | 11.30 | 12.05 | 12.95 | 15.08 | 18.68 |

A: control tire with steel wires
B: tire according to the invention
C: control tire with plied yarns It is therefore seen that the three tires have practically the same behavior.

(3) Crown impacts

Each tire is mounted on a 4.00 J 13 wheel and is inflated to 2.2 bars. A hemispherical indentor, guided in vertical translation, is caused to fall from a variable height onto the crown of each tire, the impact taking place at the center of the tread. The energy necessary to pierce the two belt plies of each tire is determined. The results are set forth in table 3.

TABLE 3

| Tire | Crown impacts Energy of Rupture (Nm) |
|---|---|
| A | 223 |
| B | 264 |

TABLE 3-continued

| Tire | Crown impacts Energy of Rupture (Nm) |
|---|---|
| C | >314 |

A: control tire with steel wires
B: tire in accordance with the invention
C: control tire with plied yarns The tire of the invention (B) therefore has better resistance to impacts than the control tire with steel wires (A), while the control tire with plied yarns (C) has the best resistance to impacts.

(4) Endurance

Each tire is mounted on a 4.00 J 13 wheel and inflated to 2 bars. It is caused to roll on a rotor wheel of 22 m circumference at an average speed of 72 km/hr under a load of 320 dan with overload sequences and on different types of coverings and obstacles which intentionally produce shears in the belt plies. The test is stopped at 40,000 km and it is noted that the three tires do not at that time show any substantial deterioration, that is to say they behave in equivalent fashion.

In conclusion, the tire according to the invention is lighter than the steel wire tire, while having practically the same drift thrust, the same resistance to rolling, the same endurance behavior, and better resistance to perforation.

Furthermore, the tire of the invention has a far better drift thrust than the control tire with plied yarns.

When the angle $\gamma$ becomes equal to or greater than 30° and/or when the twist of a monofilament on itself becomes equal to or greater than 10 turns per meter, the tenacity $T_a$ of the assemblage as well as its modulus $M_a$ decrease excessively.

The assemblages of the invention are economically advantageous and can be produced, whatever the architecture of the assemblages, on the existing machines for the cabling of steel wires.

In the assemblage of the invention, we preferably have $\gamma < 20°$ and even more advantageously, $\gamma < 10°$.

In the assemblage of the invention, there are preferably at least one of the following relationships:

$$T_a \geq 110; M_a \geq 3000; (Ar)_a > 3.$$

Advantageously, there is at least one of the following relationships:

$$T_a \geq 140; M_a \geq 4000; (Ar)_a > 3.5.$$

The monofilament used in the assemblage according to the invention preferably satisfies the previously mentioned relationships:

$1.7 \leq (Ti)_m < 180; T_m \geq 170 - D_m/3; Mi > 2000$, and it preferably satisfies the relationship $(Ar)_m > 2$.

When this monofilament is of aramid, it preferably satisfies the preferred relationships given in Application PCT/CH90/00155 mentioned above and, in particular, at least one of the following relationships:

$$T_m \geq 190 - D_m/3; Mi \geq 6800 - 10 D_m; (Ar)_m > 3.$$

In these relationships, the tenacities and moduli are expressed in cN/tex, the elongations upon rupture in %, $D_m$ is expressed in μm, and $(Ti)_m$ is expressed in tex.

The preceding examples in accordance with the invention were produced with monofilaments of poly(p-phenylene terephthalamide) but one may use other aramid monofilaments in accordance with Application PCT/CH90/00155 mentioned above or monofilaments other than aramids, for instance monofilaments of aromatic polyesters. One may also use combinations of monofilaments formed of different polymers, for instance an assemblage comprising aramid monofilaments and monofilaments of aromatic polyesters.

The example which follows concerns an assemblage in accordance with the invention consisting of aramid monofilaments other than poly(p-phenylene terephthalamide).

These monofilaments are of aromatic copolyamide, this copolyamide being obtained from the following monomers: terephthaloyl dichloride, paraphenylene diamine, 1,5-naphthylene diamine (NDA), with 3 mols of NDA to 100 mols of diamines, these monofilaments being in accord with the aforesaid Application PCT/CH90/00155.

The average characteristics of the monofilaments are as follows:

$(Ti)_m$: 36.3 tex
$D_m$: 180 μm
$T_m$: 121 cN/tex
Mi: 4570 cN/tex
$(Ar)_m$: 3.2%
ρ: 1.42 g/cm³

The properties of the assemblage are the following, this assemblage having the formula (1+6)18:

γ: 6 degrees
$(Ti)_a$: 257 tex
$D_a$: 540 μm
$T_a$: 109 cN/tex
$M_a$: 3820 cN/tex
$(Ar)_a$: 3.4%

All of these properties are determined in accordance with chapter I above, these monofilaments being produced in accordance with chapter II above.

The following example relates to an assemblage with monofilaments of aromatic polyester.

These monofilaments are obtained by the melt spinning of a commercial aromatic polyester Vectra ® of Hoechst Celanese, the temperature of extrusion of the polymer being close to 340° C., through a capillary (diameter 800 μm) of a spinneret maintained at a temperature of 270° C. The liquid jet emerging from the spinneret is drawn in air (draw ratio equal to 19.8) and is solidified by passage through a heat quenching zone.

The monofilament thus obtained is taken up on a winding device at a speed of 590 m/min in order to be subjected then to a post-polycondensation heat treatment on the receiving bobbin. This treatment is carried out in accordance with different temperature stages of between 220° and 260° C. and a final step of 16 hours at 270° C.

The monofilaments thus spun and treated have the following average properties:

$(Ti)_m$: 36.4 tex
$D_m$: 182 μm
$T_m$: 131 cN/tex
Mi: 4300 cN/tex
$(Ar)_m$: 2.5%
ρ: 1.40 g/cm³

The properties of the assemblage are the following, this assemblage having the formula (1+6) 18:

γ: 6 degrees
$(Ti)_a$: 258 tex
$D_a$: 545 μm
$T_a$: 112 cN/tex
$M_a$: 3800 cN/tex
$(Ar)_a$: 2.5%

All these properties are determined in accordance with chapter I above.

The examples in accordance with the invention which have been previously described were produced completely with continuous monofilaments of liquid crystal polymers, but the invention applies to cases in which the assemblages comprise other components than such monofilaments, for instance rubbers or plastic resins forming a core or at least partially impregnating these monofilaments, or reinforcement elements formed of staple fibers or of inorganic or metallic threads.

Of course, the invention is not limited to the embodiments described above. Thus, for instance, it applies to assemblages other than those of formula (1+6), the assemblages of the invention being preferably of the "layer cable" type (saturated or unsaturated layers), for instance of formula (3+8), with three monofilaments cabled together serving as core and a layer of eight monofilaments wound around this core, these assemblages possibly comprising several layers of monofilaments.

The assemblages in accordance with the invention can be produced by known methods and with known devices. These methods and devices which, for purposes of simplification have not been described, can, for instance, be cabling methods and devices similar to those used to produce assemblages with metal wires, in such a manner that the twisting of the monofilaments on themselves is less than 10 twists per meter of assemblage.

We claim:

1. A reinforcement assemblage formed at least in part of continuous monofilaments of liquid crystal organic polymer or polymers, characterized by the following features:

(a) the diameter $D_m$ of the monofilaments is at least equal to 40 μm and less than 400 μm;
   (b) the tenacity $T_a$ of the assemblage is greater than 80 cN/tex;
   (c) the secant tensile modulus $M_a$ of the assemblage is greater than 2000 cN/tex;
   (d) at least one of the monofilaments is wound helically around an axis of the assemblage, the acute angle γ which each monofilament makes with this axis, being less than 30°;
   (e) the twist of each monofilament on itself is less than 10 turns per meter of assemblage.

2. An assemblage according to claim 1, wherein the angle γ is less than 20°.

3. An assemblage according to claim 2, the angle γ is less than 10°.

4. An assemblage according to claim 1, wherein said assemblage satisfies at least one of the following relationships:

$T_a \geq 110; M_a \geq 3000; (Ar)_a > 3;$ $(Ar)_a$ being the elongation upon rupture of the assemblage, expressed in %.

5. An assemblage according to claim 4, wherein said assemblage satisfies at least one of the following relationships:

$T_a \geq 140; M_a \geq 4000; (Ar)_a > 3.5.$

6. An assemblage according to claim 1, wherein at least one of the monofilaments satisfies the relationships:

$1.7 \leq (Ti)_m < 180$;
$T_m \geq 170 - D_m/3$;
$Mi > 2000$;

$(Ti)_m$ being the titer of the monofilament expressed in tex, $T_m$ being the tenacity of the monofilament expressed in cN/tex, Mi being the initial modulus of the monofilament expressed in cN/tex, and $D_m$ being expressed in μm.

7. An assemblage according to claim 6, wherein the monofilament is an aramid monofilament.

8. An assemblage according to claim 6, wherein the monofilament satisfies the following relationship:

$$(Ar)_m > 2$$

$(Ar)_m$ being the elongation upon rupture of the monofilament.

9. An assemblage according to claim 8, wherein the monofilament consists of an aramid and satisfies at least one of the following relationships:

$T_m \geq 190 - D_m/3$; $Mi \geq 6800 - 10D_m$; $(Ar)_m > 3$.

10. An assemblage according to claim 9, wherein the monofilament consists of poly(p-phenylene terephthalamide).

11. An assemblage according to claim 1, wherein said assemblage has a layer cable structure.

12. An assemblage according to claim 1, wherein said assemblage is at least partially impregnated with rubber or a plastic resin.

13. An article reinforced by at least one assemblage according to claim 1.

14. An article according to claim 13, wherein said assemblage is an automobile tire.

15. An automobile tire according to claim 14, wherein the assemblage is used to reinforce the crown of the tire.

* * * * *

UNITED STATES PATENT AND TRADEMARK OFFICE
CERTIFICATE OF CORRECTION

PATENT NO. : 5,427,165

DATED : June 27, 1995

INVENTOR(S) : Claudio Balestra and Joel Ribiere

It is certified that error appears in the above-identified patent and that said Letters Patent is hereby corrected as shown below:

Col. 2, bridging lines 15-16, "assemblages" should read --assembly--

Col. 4, line 14, "state" should read --state and--

Col. 4, line 24, "joined attached" should read --joined--

Col. 4, line 38, "layer of noncoagulating fluid" should read --noncoagulating layer of fluid--

Col. 4, line 50, that portion of the equation reading "$KD^{m2}$" should read --$KD_m^2$--

Col. 6, line 38, "center-to-center" should read --axis-to-axis--

Col. 8, line 18, "dan" should read --daN--

UNITED STATES PATENT AND TRADEMARK OFFICE
CERTIFICATE OF CORRECTION

PATENT NO. : 5,427,165
DATED : June 27, 1995
INVENTOR(S) : Claudio Balestra and Joel Ribiere It is certified that error appears in the above-indentified patent and that said Letters Patent is hereby corrected as shown below:

Col. 10, line 52, "claim 2" should read --claim 2., wherein--.

Signed and Sealed this

Fifth Day of December, 1995

Attest:

BRUCE LEHMAN

*Attesting Officer*     *Commissioner of Patents and Trademarks*